(12) United States Patent
Johansson

(10) Patent No.: US 6,425,840 B1
(45) Date of Patent: Jul. 30, 2002

(54) DIFFERENTIAL GEAR

(75) Inventor: Alf Johansson, Nykvarn (SE)

(73) Assignee: Scania CV Aktiebolag (publ) (SE)

( * ) Notice: Subject to any disclaimer, the term of this patent is extended or adjusted under 35 U.S.C. 154(b) by 0 days.

(21) Appl. No.: 09/582,332

(22) PCT Filed: Dec. 18, 1998

(86) PCT No.: PCT/SE98/02375

§ 371 (c)(1),
(2), (4) Date: Jun. 23, 2000

(87) PCT Pub. No.: WO99/34996

PCT Pub. Date: Jul. 15, 1999

(30) Foreign Application Priority Data

Dec. 23, 1997 (SE) .................................. 9704848

(51) Int. Cl.⁷ .............................................. F16H 48/10
(52) U.S. Cl. ..................... 475/245; 475/223; 475/244; 475/247
(58) Field of Search ................. 475/223, 243, 475/244, 245, 246, 247

(56) References Cited

U.S. PATENT DOCUMENTS

| | | | |
|---|---|---|---|
| 2,309,441 A | * 1/1943 | Cook | 475/223 |
| RE29,872 E | * 1/1979 | Goscenski | 475/232 |
| 4,289,047 A | * 9/1981 | Hopkins | 475/246 |
| 4,733,578 A | 3/1988 | Glaze et al. | 74/713 |
| 4,754,847 A | 7/1988 | Glaze et al. | 184/6.12 |
| 5,269,731 A | * 12/1993 | Scudder et al. | 475/230 |
| 5,302,158 A | 4/1994 | Kwasniewski | 475/160 |

FOREIGN PATENT DOCUMENTS

| | | | |
|---|---|---|---|
| EP | 0566013 | 10/1993 | |
| JP | 211053 | * 12/1983 | 475/230 |

* cited by examiner

Primary Examiner—Charles A Marmor
Assistant Examiner—Ha Ho
(74) Attorney, Agent, or Firm—Ostrolenk, Faber, Gerb & Soffen, LLP

(57) ABSTRACT

A differential gear for distribution of torque between a forward driven wheel shaft and a rear driven wheel shaft on a vehicle in which the rear wheel shaft can be raised has an input shaft (3) which via differential pinions (6) is in engagement with a rear differential wheel (7) connected to an output shaft (4). The input shaft (3) and the rear differential wheel (7) are mutually supported via a bearing (15) which transmits axial forces between them. This bearing is fitted with preloading to eliminate axial play.

6 Claims, 1 Drawing Sheet

DIFFERENTIAL GEAR

TECHNICAL AREA

The invention relates to a differential gear distributing torque between a forward wheel shaft to be driven and a rear wheel shaft to be driven on a vehicle and particularly relates to maintaining positive drive from the input shaft to each of the output shafts through maintaining axial force transmission.

1. State of the Art

Vehicles with tandem-driven rear axle bogies generally incorporate a differential gear for distributing the drive torque delivered by the engine to the forward and rear wheel shafts. It has been usual for both wheel shafts to be continuously powered. The increasingly common use of air-sprung wheel shafts affords the possibility even in a tandem bogie of raising one of the wheel shafts, normally the rear one, which thereby comes off load but continues to rotate. This also eliminates the force via the differential which provides guidance of the input shaft, consequently impairing not only gear engagement in the transfer gearbox but also the differential locking function, and causing undesirable wear. These problems arise from the occurrence of axial play in the differential gear, with the result that the now off-load input shaft is no longer guided as well as previously. These problems do not occur when the rear wheel shaft is lowered and the input shaft is subjected to normal torque load.

2. Object of the Invention

The object of the invention is to provide a differential gear which eliminates the problem of uncentered drive and inferior functioning of the differential lock in a tandem bogie when the rear wheel shaft is raised and off load.

A further object is to provide as a simple a solution as possible involving the least possible amount of modification of a previously used design.

DESCRIPTION OF THE INVENTION

The problem is solved according to the invention by providing the differential gear with distribution of torque between a forward driven wheel shaft and a rear driven wheel shaft on a vehicle in which the rear wheel shaft can be raised and the differential gear has an input shaft which via differential pinions is in engagement with a rear differential wheel connected to an output shaft. The input shaft and the rear differential wheel are mutually supported via a bearing which transmits axial forces between them. This bearing is fitted with preloading to eliminate axial play.

Fitting in accordance with the invention a preloaded taper bearing eliminates axial play of the input shaft when the differential is off load. This leads to the input shaft being held in a well-fixed position even when the output shaft is not subject to any torque load.

DESCRIPTION OF THE DRAWINGS

The invention is explained below in more detail with reference to an embodiment depicted in the attached drawings, in which.

DESCRIPTION OF A PREFERRED EMBODIMENT

Figure 1:
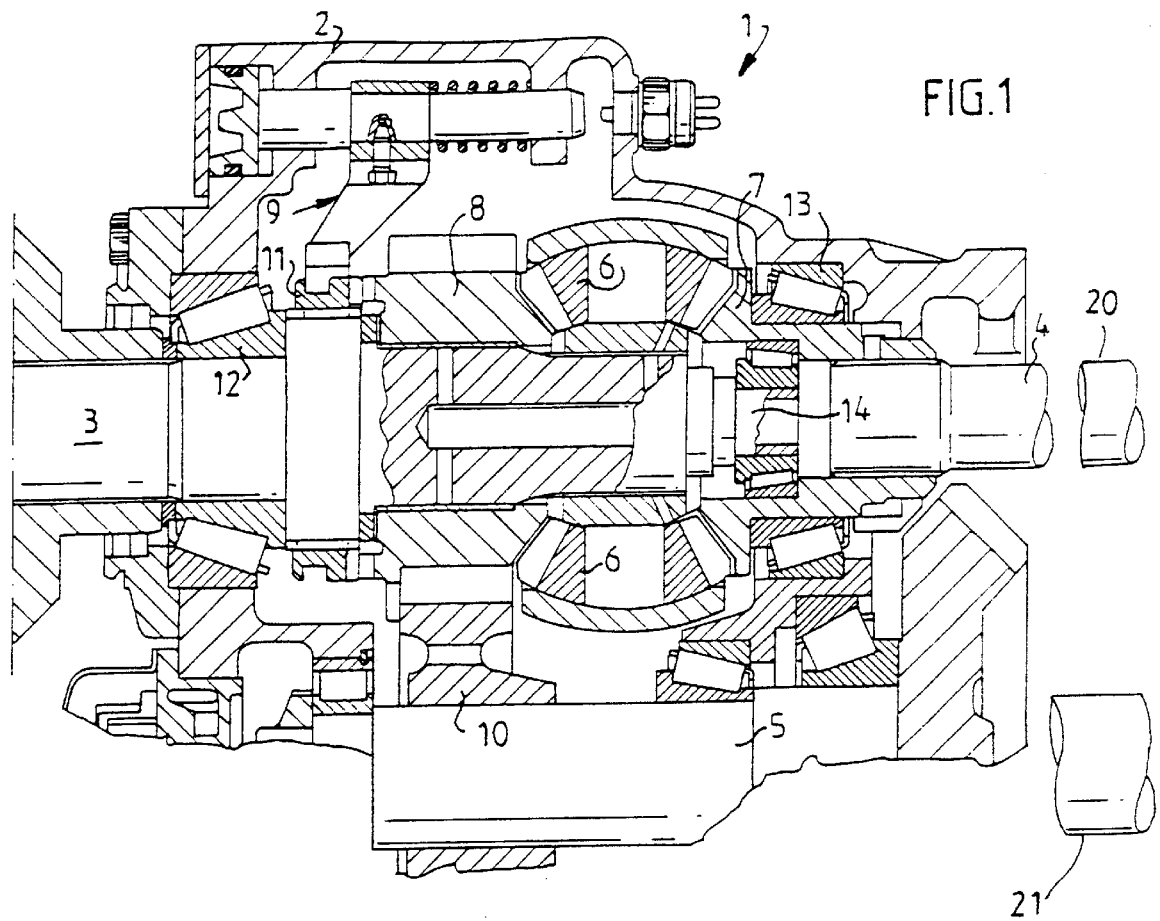
FIG. 1 shows a longitudinal section through a differential gear according to the invention.

A differential gear 1 according to the invention has a housing 2 in which a driven input shaft 3 is supported. An output shaft 4 is intended to transmit torque to the rear wheel shaft 20 in a tandem bogie on a vehicle and an output shaft 5 is intended to transmit torque to the forward wheel shaft 21 in the tandem bogie. The two output shafts 4 and 5 each drive their respective wheel shaft via their conventional rear axle differential, which is not described further in this respect. The differential gear 1 depicted is used in order to allow the wheel shafts to rotate at mutually different speeds.

The input shaft 3, which is driven by the vehicle's engine and is coaxial with the output shaft 4, bears in common rotation with it a number of differential pinions 6 mounted on and radially outward of the shaft 3, on respective radially directed axas. The pinions are operablefor driving not only a rear differential wheel 7 connected for common rotation with the output shaft 4 but also a forward differential wheel 8 mounted for rotation about the input shaft 3. A differential lock 9 can be used to couple the forward differential wheel 8 for common rotation with the input shaft 3 or to uncouple the differential wheel and the shaft 3 so that the wheel 8 rotates with respect to the shaft 3. This enables the input shaft 3 to drive, via the forward differential wheel 8, a pinions 10 which is mounted for common rotation with the output shaft 5 so that torque is transmitted to the forward wheel shaft.

The differential gear is similar in form to a bevel gear in which the toothing on the differential pinions 6 and the toothing on the cooperating rear and forward differential wheels 7,8 is conical in shape. It is this shape which gives rise to the axial forces which occur in the gear and cause the problem mentioned in the introduction of axial imbalance of forces when only one differential wheel is on load.

The differential lock 9 incorporates a pinion 11 which is movable axially on but rotates together with the input shaft 3 and which by being moved towards the forward differential wheel 8 can be brought into torque-transmitting engagement with the latter. Moving the pinion 11 in the opposite direction disengages the forward differential wheel 8.

The input shaft 3 is supported in the housing 2 via a forward bearing 12. Correspondingly, the output shaft 4 via the rear differential wheel 7 is supported in the housing 2 via a rear bearing 13. During torque transmission between the input shaft 3 and the output shaft 4, these two bearings 12 and 13 serve as a path for transmitting to the walls of the housing 2 the mutually parting axial forces which the differential pinions 6 impart to the respective forward and rear differential wheels 8 and 7.

Figure 2:
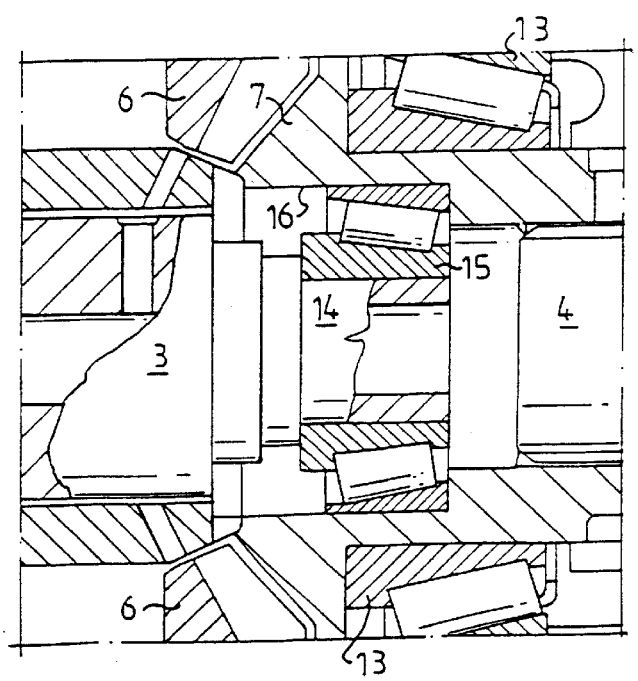
FIG. 2 shows on a larger scale a detail of FIG. 1.

As depicted in more detail in FIG. 2, the end 14 of the input shaft 3 adjacent to the rear differential wheel 7 is supported in the latter via an axial-force-transmitting inner bearing which is fitted in an axial recess 16 in the rear differential wheel 7. The results of designing the differential gear 1 in such a way that the bearings 12, 13 and 15 are preloaded include the rear differential wheel 7 being subjected to an axial load directed away from the input shaft 3. This means that the input shaft 3 and the rear differential wheel 7 are at all times held well fixed in position even when there is no need to transmit any torque owing to the rear wheel shaft 21 being raised and the differential lock 9 being brought into engagement and transmitting the incoming torque from the input shaft 3 to the output shaft 5 and the wheel connected to the latter on the forward wheel shaft.

As may be seen in the drawings, it is advantageous for the bearings 12, 13 and 15 to be of the taper roller bearing type which withstands large radial and axial loads. The desired preloading may with advantage be achieved by means of suitably dimensioned spacing discs. In the version here depicted, the bearing 15 in the axial direction has its outer ring abutting against a shoulder in the rear differential wheel 7 and its inner ring against a shoulder on the input shaft 3. An opposite arrangement is also possible.

What is claimed is:

1. A differential gear for distributing torque between a first output shaft and a second output shaft in a vehicle, the output shafts being connectable to respective wheel shafts of a vehicle, the output shafts being eccentric to one another, the differential gear comprising:

a rotatable input shaft;

a forward differential wheel mounted for rotation on and about the input shaft;

the second output shaft being coaxial with the input shaft;

a rear differential wheel connected on the second output shaft for common rotation therewith;

a drive pinion on and connectable for driving the first output shaft; the drive pinion being engaged with the forward differential wheel and the forward differential wheel driving the drive pinion and the first output shaft to rotate with the forward differential wheel;

a differential lock selectively movable for coupling the common forward differential wheel for rotation with the input shaft for thereby rotating the drive pinion and the first output shaft and the differential lock being selectively movable for uncoupling the forward differential wheel for common rotation together with the input shaft;

conical shaped differential pinions disposed on the input shaft to rotate along with the input shaft, the differential pinions being disposed between the rear and forward differential wheels, the differential pinions engaging the rear differential wheel and being oriented for rotating the rear differential wheel and also engaging the forward differential wheel and being oriented for rotating the forward differential wheel, the conical differential pinions applying axial parting forces which are transmitted to the input and output shafts, respectively, from the differential pinions;

a housing around the differential pinions and the input and output shafts; a forward bearing forward of the forward differential wheel away from the differential pinions and a rear bearing rearward of the rear differential wheel away from the pinions, and the forward and rear bearings respectively transmitting the forwardly directed and the rearwardly directed axial parting forces caused by the differential pinions to the housing;

the input shaft having an end situated axially adjacent to the rear differential wheel; an inner bearing supporting the end of the input shaft to the rear differential wheel, wherein the inner bearing provides axial force transmission between the input shaft and the rear differential wheel;

wherein the input shaft has a rearward facing shoulder for engaging the inner bearing and the inner bearing, is arranged within the rear differential wheel, and the rear differential wheel has a forward facing shoulder against which the inner bearing abuts.

2. The differential gear of claim 1, further comprising a forward driven wheel shaft connected with the first output shaft and a rear driven wheel shaft connected with the second output shaft.

3. The differential gear of claim 2, wherein the inner bearing for the end of the input shaft, the forward bearing and the rear bearing are all fitted with preloading for eliminating axial bearing play, so that the rear differential wheel maintains play free coupling with the input shaft.

4. The differential gear of claim 1, wherein the inner bearing for the end of the input shaft, the forward bearing and the rear bearing are all fitted with preloading for eliminating axial direction bearing play.

5. The differential gear of claim 1, wherein the inner bearing is a tapered roller bearing.

6. The differential gear of claim 5, wherein the forward bearing and the rear bearing are both of the tapered roller bearing type, tapering narrower outwardly away from the differential pinons.

* * * * *